(No Model.)
D. LUBIN.
HARROW.
No. 357,151. Patented Feb. 1, 1887.
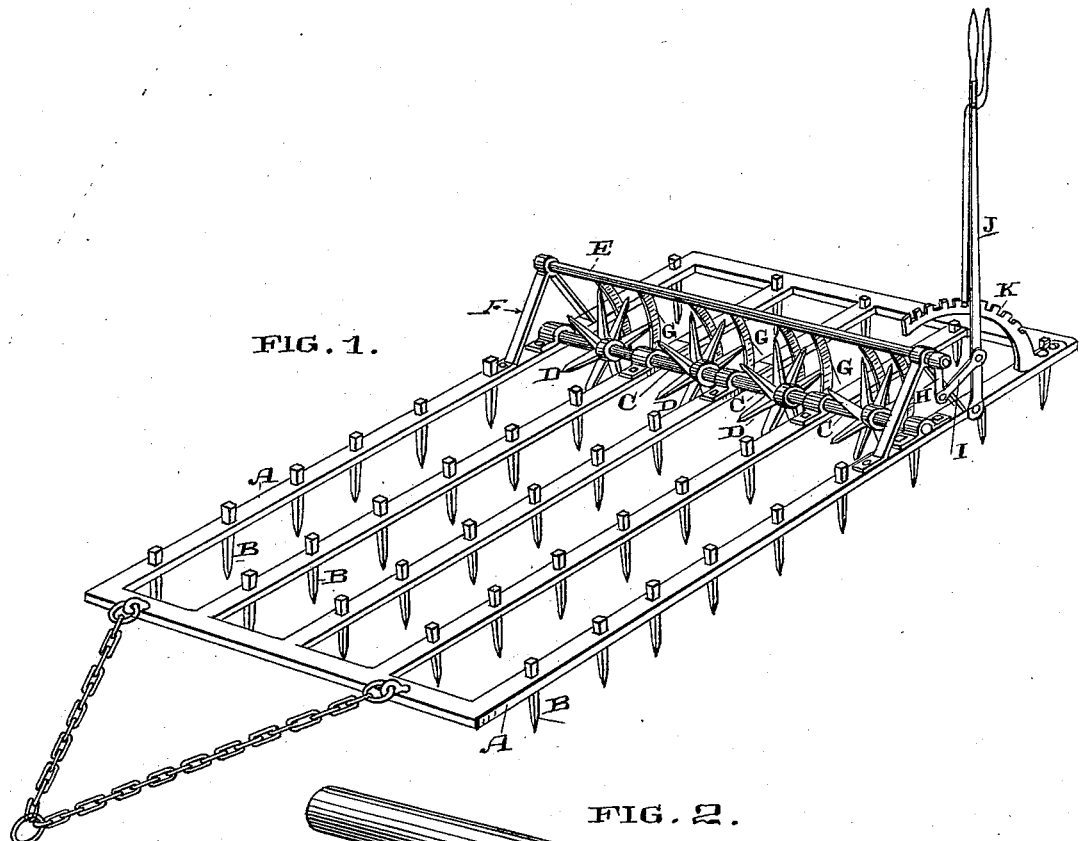
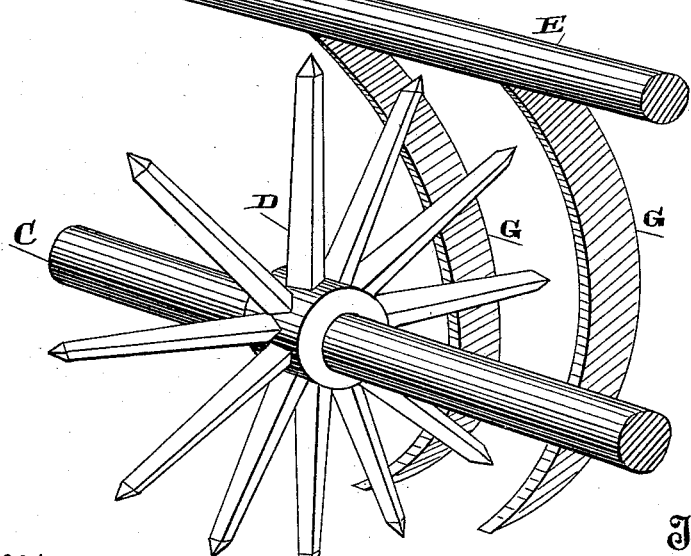
Witnesses,
J. H. Truise
H. C. Lee.
Inventor,
David Lubin

UNITED STATES PATENT OFFICE.

DAVID LUBIN, OF SACRAMENTO, CALIFORNIA.

HARROW.

SPECIFICATION forming part of Letters Patent No. 357,151, dated February 1, 1887.

Application filed November 18, 1886. Serial No. 219,322. (No model.)

*To all whom it may concern:*

Be it known that I, DAVID LUBIN, of Sacramento, Sacramento county, State of California, have invented an Improvement in Harrows; and I hereby declare the following to be a full, clear, and exact description of the same.

My invention relates to certain improvements in harrows; and it consists of a combination, with the harrow having fixed teeth, of one or more series of radial spiked wheels mounted upon an axle or axles extending across the harrow-frame, so that the wheels may rotate between the lines of the harrow-teeth. In connection with these wheels I may employ adjustable lifting arms or fingers, placed either in front or behind the line of the shaft of the rotating wheels.

Referring to the accompanying drawings for a more complete explanation of my invention, Figure 1 is a perspective view of a harrow, showing one line of wheels and adjustable fingers. Fig. 2 is an enlarged detail showing one of the wheels and its adjacent fingers.

A is a harrow-frame, having teeth B fixed in the usual or any suitable manner so as to harrow the ground. Across this frame at one or more points, as may be found desirable, extends a shaft or shafts, C, turning in the boxes, and these shafts have fixed upon them at intervals between the longitudinal frames of the harrow the radially-spiked wheels D, the teeth of which are adapted to enter the ground so that the shaft and wheels may be rotated as the harrow is drawn over the ground. A shaft, E, extends across the frame, either in front of or behind each of the axles C, and is supported in brackets F, as shown. From this shaft curved arms or fingers G extend downward, either in front of or behind the axle, as may be found most suitable for the work to be done.

These fingers enter the ground and lift up the earth, and especially clods, which it may be desired to crush more completely by the action of the rotary wheels in connection with these fingers and the harrow-teeth. At one end of this shaft E is a crank-arm, H, and this arm is connected by a link, I, with an actuating hand-lever, J, which extends upward, so that the driver of the team may reach it and move it to turn the fingers G backward, so as to relieve them from any clogging that may take place while in operation.

K is a curved rack by which the lever may be held at any desired point.

While this construction resembles in some of its features the arrangement which I have shown in my former applications, it differs essentially from those, in being made applicable to an ordinary harrow composed of longitudinal and transverse frames with a series of fixed teeth, and by the arrangement for combining the rotary spiked wheels and lifting-fingers with the same.

Having thus described my invention, what I claim as new, and desire to secure by Letters Patent, is—

A harrow having the fixed teeth, and the transverse shaft or shafts having a series of spiked wheels mounted thereon, in combination with a transverse shaft, E, a series of lifting-fingers projecting from said shaft, the crank-arm H, the link I, and the operating-lever and holding-rack, substantially as herein described.

In witness whereof I have hereunto set my hand.

DAVID LUBIN.

Witnesses:
W. H. SMITH,
L. PETERSON.